(12) United States Patent
Hosoya

(10) Patent No.: US 6,387,265 B1
(45) Date of Patent: May 14, 2002

(54) METHOD AND SYSTEM FOR MANAGING WATER SYSTEM HABITAT ENVIRONMENT

(75) Inventor: Makoto Hosoya, Kanagawa-ken (JP)

(73) Assignee: Takachiho Corporation, Kanagawa-ken (JP)

( * ) Notice: Subject to any disclaimer, the term of this patent is extended or adjusted under 35 U.S.C. 154(b) by 0 days.

(21) Appl. No.: 09/828,232

(22) Filed: Apr. 9, 2001

(30) Foreign Application Priority Data

Oct. 3, 2000 (JP) ........................................ 2000-304125

(51) Int. Cl.$^7$ .................................................. C02F 3/30
(52) U.S. Cl. ........................ 210/602; 210/605; 210/610; 210/617; 210/150; 210/170; 210/195.1; 210/903; 210/747
(58) Field of Search ................................ 210/602, 605, 210/610, 615, 617, 630, 747, 150, 151, 170, 195.1, 196, 903

(56) References Cited

U.S. PATENT DOCUMENTS

| | | | | |
|---|---|---|---|---|
| 2,822,329 A | * | 2/1958 | Griffith | 210/170 |
| 3,701,727 A | * | 10/1972 | Kormanile | 210/630 |
| 4,995,980 A | * | 2/1991 | Jaubert | 210/150 |
| 5,160,039 A | * | 11/1992 | Colbum | 210/150 |
| 5,330,651 A | * | 7/1994 | Robertson et al. | 210/747 |
| 5,584,991 A | * | 12/1996 | Wittstuck et al. | 210/170 |
| 5,993,649 A | * | 11/1999 | DeBusk et al. | 210/602 |
| 6,068,773 A | * | 5/2000 | Sheaffer | 210/747 |
| 6,136,185 A | * | 10/2000 | Sheaffer | 210/605 |
| 6,153,094 A | * | 11/2000 | Jowett et al. | 210/615 |
| 6,241,877 B1 | * | 6/2001 | Berkey | 210/170 |

FOREIGN PATENT DOCUMENTS

JP  10114593  5/1998

OTHER PUBLICATIONS

English Language Abstract of JP 10–114593.

* cited by examiner

Primary Examiner—Christopher Upton
(74) Attorney, Agent, or Firm—Greenblum & Bernstein, P.L.C.

(57) ABSTRACT

A method for managing a water system habitat environment and a system for managing a water system habitat environment are provided in which oxides which accumulate in a relatively small-scale water environment are continuously and effectively reduction changed and released into the atmosphere, such that a balance between oxidation changing and reduction changing of solute can be achieved. Furthermore, building up to a balanced state can be carried out in a short period of time from creation of the water environment, and the balanced state can be maintained over a long period of time. Soil (22), in which an organic carbon source (21) is mixed-in in a predetermined amount with respect to an amount of water in a pond (10), is covered, to a predetermined thickness, on substantially an entire bottom of a depression (4) which is to become the pond (10) and whose bottom portion has been subjected to a waterproofing treatment (3). By filling water and maintaining a dead water state over a predetermined number of days, a reduction region (20) is built up. Thereafter, an oxidation region (30) is built up by carrying out aeration over a predetermined number of days.

19 Claims, 12 Drawing Sheets

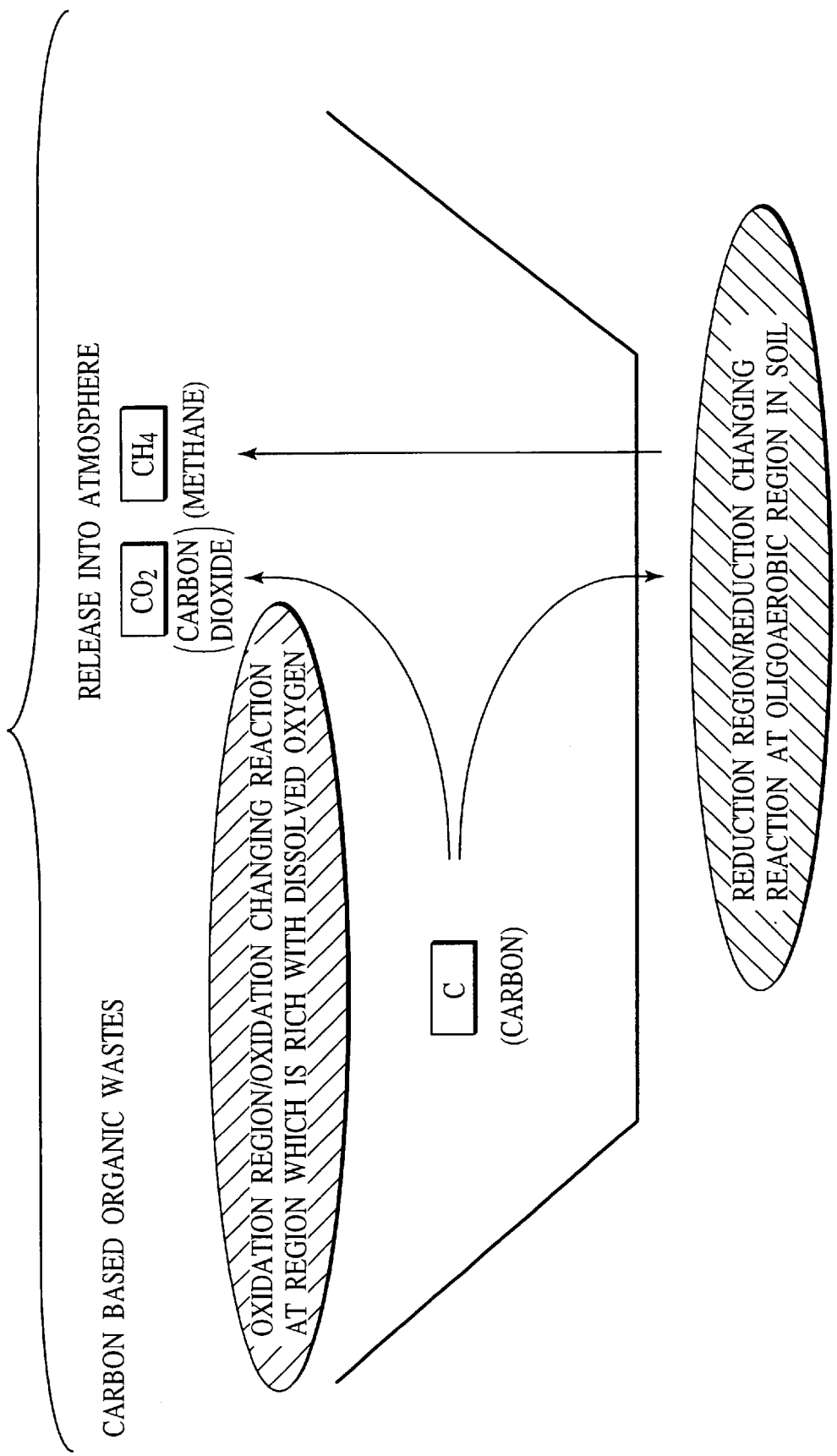

FIG.11

PHOSPHOR BASED ORGANIC WASTES

OXIDATION REGION/OXIDATION CHANGING REACTION AT REGION WHICH IS RICH WITH DISSOLVED OXYGEN (PHOSPHOR) P → PO4− (PHOSPHATE)

SPECIFIC ADSORPTION SETTLING REACTION DUE TO STRONG AFFINITY WITH METAL IONS/Al, Fe, Ca IN SLIGHTLY ACIDIC SOLVENT

ALIMENTATION BY GRASSES SUCH AS MARSH REEDS, MAKOMO, AND THE LIKE

REDUCTION REGION/ELUTION REACTION ACCOMPANYING REDUCTION CHANGE OF METAL IONS IN OLIGOAEROBIC REGION IN SOIL

METHOD AND SYSTEM FOR MANAGING WATER SYSTEM HABITAT ENVIRONMENT

BACKGROUND OF THE INVENTION

1. Field of the Invention

The present invention relates to a method for managing a water system habitat environment which is applied to, for example, a pond provided in the garden at the home of an individual, and to a system for managing a water system habitat environment.

2. Description of the Related Art

Generally, when a pond is provided in the garden of a home of an individual, the quality of the water deteriorates in a relatively short period of time due to the fact that the amount of water in the pond is limited. This is due to the following reasons.

Various types of substances and chemical species dissolve in the water, and the solute undergoes a change in substance and continues to exist as some type of chemical species. The presence of oxygen strongly relates to such a changing reaction. Due to oxygen being applied to the solute, the solute oxidation-changes into another chemical species. By depriving the solute of oxygen, the dissolved mater reduction-changes into another chemical species.

However, a relatively small-scale water environment such as a pond is easily affected by the atmosphere. Due to oxygen in the air dissolving into the water, the chemical species in the water tend to oxidize. As a result, chemical species including toxic matter (ammonia or the like) at the initial stages, such as organic and inorganic solute which has flowed into the pond and organic waste which is generated due to the life activity of organisms inhabiting the water, undergo an oxidation change. Thus, oxides such as nitrate nitrogen, sulfates, phosphates and the like accumulate in the water. As a result, the water is eutrophized due to the accumulation of the final oxides, ultimately leading to a deterioration of the water environment due to a lowering of the pH and a propagation of seaweeds and mosses.

However, in conventional water management techniques, an effective method for reduction-changing oxides, such as nitrate nitrogen, sulfates, phosphates, and the like, which accumulate in the water, and releasing them into the atmosphere has not been realized. Thus, it has not been possible to prevent the predominant trend toward oxidation change in a relatively small-scale water environment such as a pond. There has therefore been the problem that it has only been possible to maintain good water quality by replacing the water which has become dirty.

SUMMARY OF THE INVENTION

The present invention has been achieved to solve such problems. It therefore is an object of the invention to provide a method for managing a water system habitat environment and system for managing a water system habitat environment which overcome the above-described problems of conventional systems, and which aim for a balance between oxidation change and reduction change of solute by continuously and effectively reduction-changing and releasing into the atmosphere oxides which have accumulated in a relatively small-scale water environment, and which permit this balanced state to be built up in a short time from the time of creation of the water environment, and which enable this balanced state to be maintained over a long period of time.

The present invention solves the above-described problems, and a first aspect of the present invention provides a method for managing a water system habitat environment which creates and maintains a clear state of water quality of a pond, the method comprising the steps of: placing, to a necessary thickness, for example, more than 100 mm, preferably 300 mm, and on substantially an entire bottom of a depression whose bottom portion has been subjected to a waterproofing treatment and which is to become the pond, soil in which is mixed-in an organic carbon source in a necessary amount with respect to an amount of water in the pond; building up a reduction region by filling in water and maintaining a dead water state for a predetermined number of days; and thereafter, building up an oxidation region by effecting aeration for a predetermined number of days.

A second aspect of the present invention provides a method for managing a water system habitat environment which creates and maintains a clear state of water quality of a pond according to the first aspect, further comprising filling rain water in through a pH adjusting portion which has a pH adjusting function.

A third aspect of the present invention provides a method for managing a water system habitat environment according to the first aspect, wherein following the building up of the oxidation region, a filter device which has an organism filtering function is operated for a predetermined number of days, and due to the water of the pond passing through the filter device, a water environment is stabilized.

A fourth aspect of the present invention provides a method for managing a water system habitat environment according to the first aspect, wherein after the soil is placed in, planting of plants at appropriate places is carried out, and after building up of the oxidation region, organisms are introduced.

A fifth aspect of the present invention provides a method for managing a water system habitat environment according to the first aspect, wherein a main component of the organic carbon source is aliphatic polyester, and a target ratio of the organic carbon source mixed in the soil is 10 grams of the organic carbon source per 50 to 100 liters of the water of the pond.

A sixth aspect of the present invention provides a method for managing a water system habitat environment according to the first aspect, wherein a target period of time for the building up of the reduction region is about several days, for example, about three days, in summer, is about one to two weeks, for example, about 10 days, in winter, and is a period of time therebetween, for example, about five days, in spring and fall.

A seventh aspect of the present invention provides a method for managing a water system habitat environment according to the first aspect, wherein a target period of time for the building up of the oxidation region is about several days, for example, three weeks in summer, four weeks in spring and autumn, and five weeks in winter.

An eighth aspect of the present invention provides a method for managing a water system habitat environment according to the third aspect, wherein the organism filtering function of the filter device is an organism filtering function due to aerobic bacteria implanted at a surface layer portion of a porous ceramic filter material and anaerobic bacteria implanted at a central portion.

A ninth aspect of the present invention provides a method for managing a water system habitat environment according to the third aspect, wherein, in a water environment, which may preferably be at an appropriate water temperature and rich in dissolved oxygen, a target number of days of operation of the filter device is about two to four weeks in the summer, is about four to six weeks in the winter, and is a period of time therebetween in spring and fall.

A tenth aspect of the present invention provides a method for managing a water system habitat environment according to the third aspect, wherein in a case in which there is turbidity in the water of the pond after a water environment has been stabilized, that is rendered clear, by operation of the filter device, the filter device is again operated until the turbidity is eliminated, and this process is repeated as necessary until a degree of clearness of water in a dead water state can be maintained.

An eleventh aspect of the present invention provides a method for managing a water system habitat environment according to the third aspect, wherein after a water environment has been stabilized by operation of the filter device, or after operation of the filter device has been repeated until a degree of clearness of the water in a dead water state can be maintained, the filter device is removed if needed.

A twelfth aspect of the present invention provides a method for managing a water system habitat environment according to the third aspect, wherein after a water environment has been stabilized by operation of the filter device, or after operation of the filter device has been repeated until a degree of clearness of the water in a dead water state can be maintained, the water of the pond is maintained in a running water state in which the water is substantially circulated.

A thirteenth aspect of the present invention provides a system for managing a water system habitat environment which creates and maintains a clear state of water quality of a pond, the system comprising: a reduction region of a necessary thickness which is formed by placing, on substantially an entire bottom of a depression whose bottom portion has been subjected to a waterproofing treatment and which is to become the pond, soil in which is mixed-in an organic carbon source in a necessary amount with respect to an amount of water in the pond; and aerating means for building up an oxidation region.

A fourteenth aspect of the present invention provides a system for managing a water system habitat environment which creates and maintains a clear state of water quality of a pond according to the thirteenth aspect, further comprising pH adjusting means disposed at an appropriate place at which rain water is taken in.

A fifteenth aspect of the present invention provides a method for managing a water system habitat environment according to the thirteenth aspect, further comprising: filtering means having an organism filtering function; and a circulation pump which circulates the water of the pond through the filtering means.

A sixteenth aspect of the present invention provides a method for managing a water system habitat environment according to the thirteenth aspect, wherein plants are planted at appropriate places within the pond and at a periphery of the pond, and organisms are introduced into appropriate places within the pond and at a periphery of the pond.

A seventeenth aspect of the present invention provides a method for managing a water system habitat environment according to the fifteenth aspect, wherein the filter means is formed from a large number of porous ceramic filter materials having holes (pores) of a size such that aerobic bacteria are implanted at a surface layer portion and anaerobic bacteria are implanted at a central portion.

An eighteenth aspect of the present invention provides a method for managing a water system habitat environment according to the fifteenth aspect, wherein the filtering means is provided at an appropriate place at which rain water is taken in, and the filtering means filters circulated water of the pond and rain water.

A nineteenth aspect of the present invention provides a method for managing a water system habitat environment according to the eighteenth aspect, wherein both the filtering means and the pH adjusting means are accommodated in a common container, and due to both rain water and the circulated pond water passing through the container, both the rain water and the circulated pond water are filtered and the pH thereof adjusted without distinction therebetween.

BRIEF DESCRIPTION OF THE DRAWINGS

The above and further objects and novel features of the present invention will more fully appear from the following detailed description when the same is read in conjunction with the accompanying drawings, in which:

FIG. 10 is a diagram for explaining a process of oxidation change reaction/reduction change reaction/release into the atmosphere of carbon based organic wastes in the system for managing a water system habitat environment of FIG. 1;

FIG. 11 is a diagram for explaining a process of oxidation change reaction/reduction change elution reaction/alimentation by grasses, of phosphorous based organic wastes in the system for managing a water system habitat environment of FIG. 1.

DETAILED DESCRIPTION OF THE PREFERRED EMBODIMENTS

Figure 1:
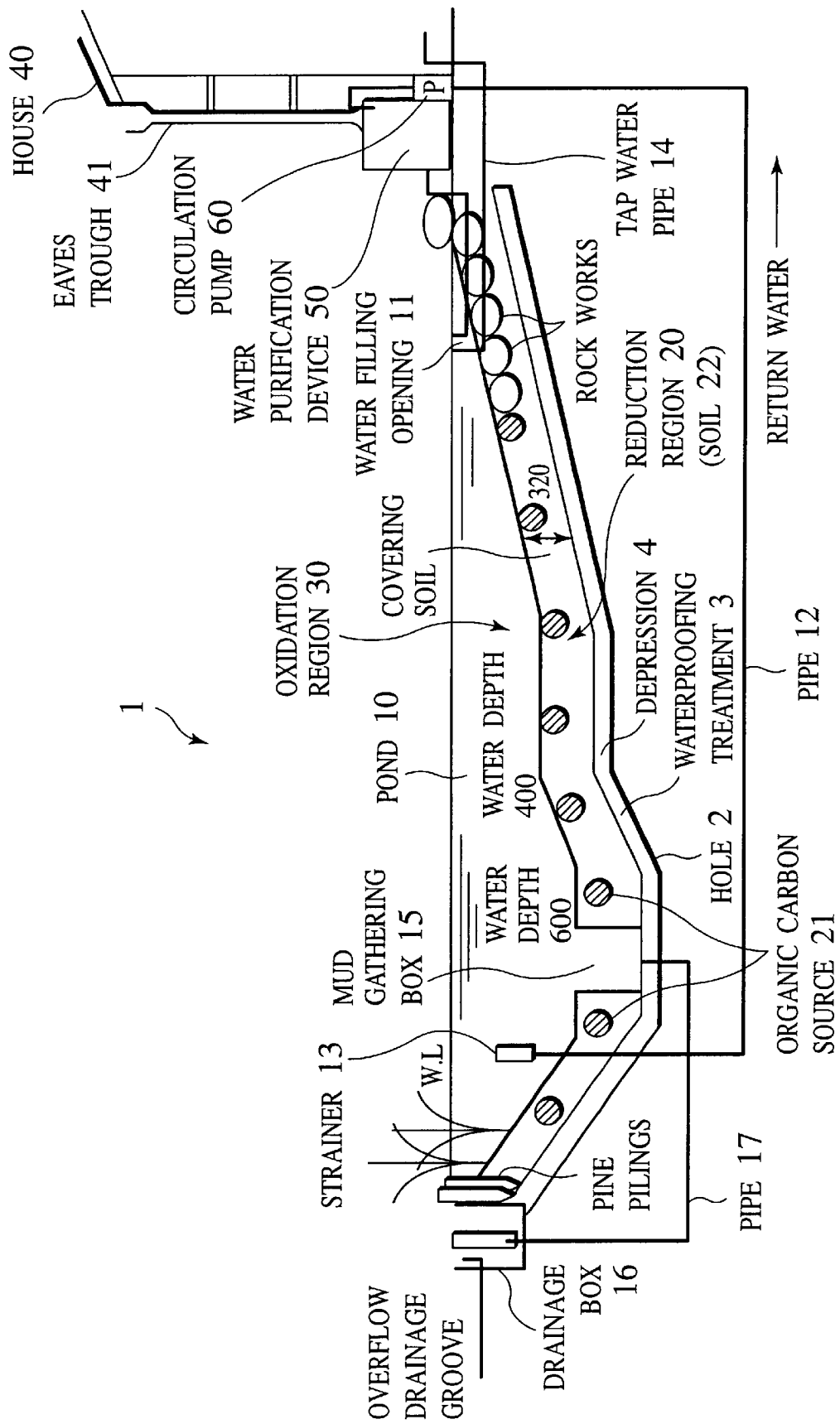
FIG. 1 is a schematic sectional view illustrating an embodiment in which a system for managing a water system habitat environment of the present invention is applied to, for example, a pond provided in the garden of a home of an individual.
Figure 2:
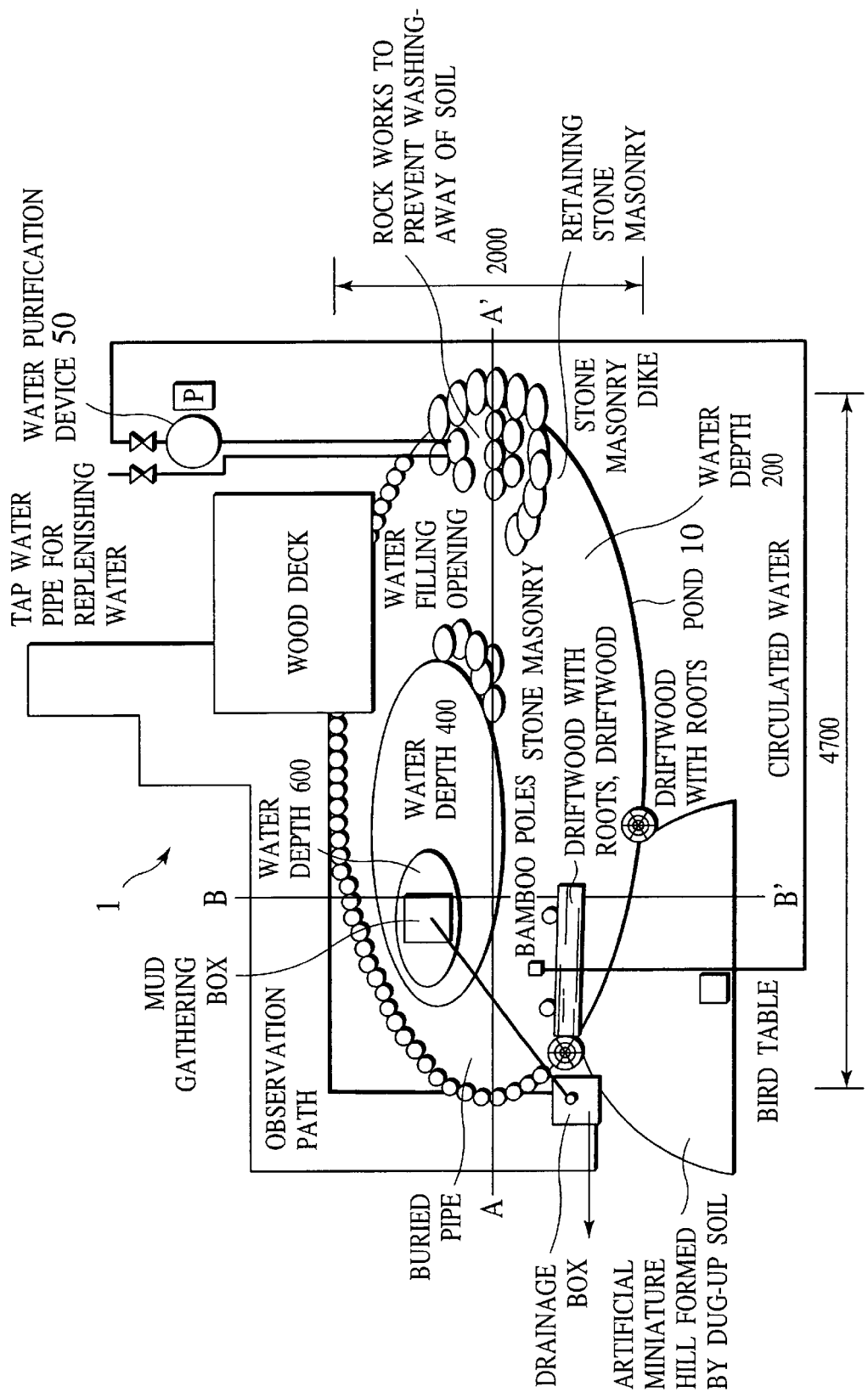
FIG. 2 is a schematic plan view illustrating the arrangement of main structures of the system for managing a water system habitat environment of FIG. 1.
Figure 3:
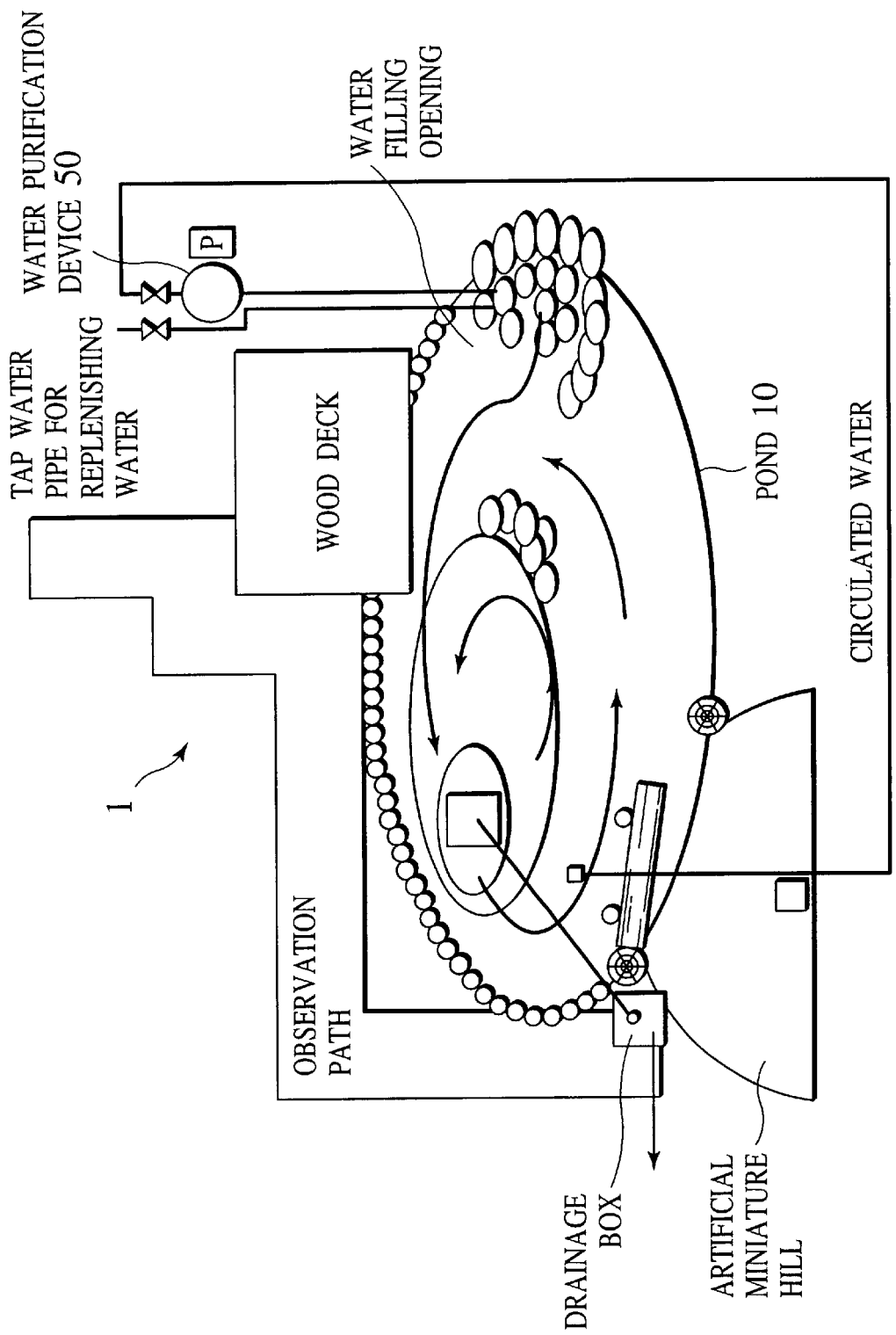
FIG. 3 is a schematic plan view showing the flow of water at the time when rain falls or the time when water is supplied in the system for managing a water system habitat environment of FIG. 1.
Figure 4:
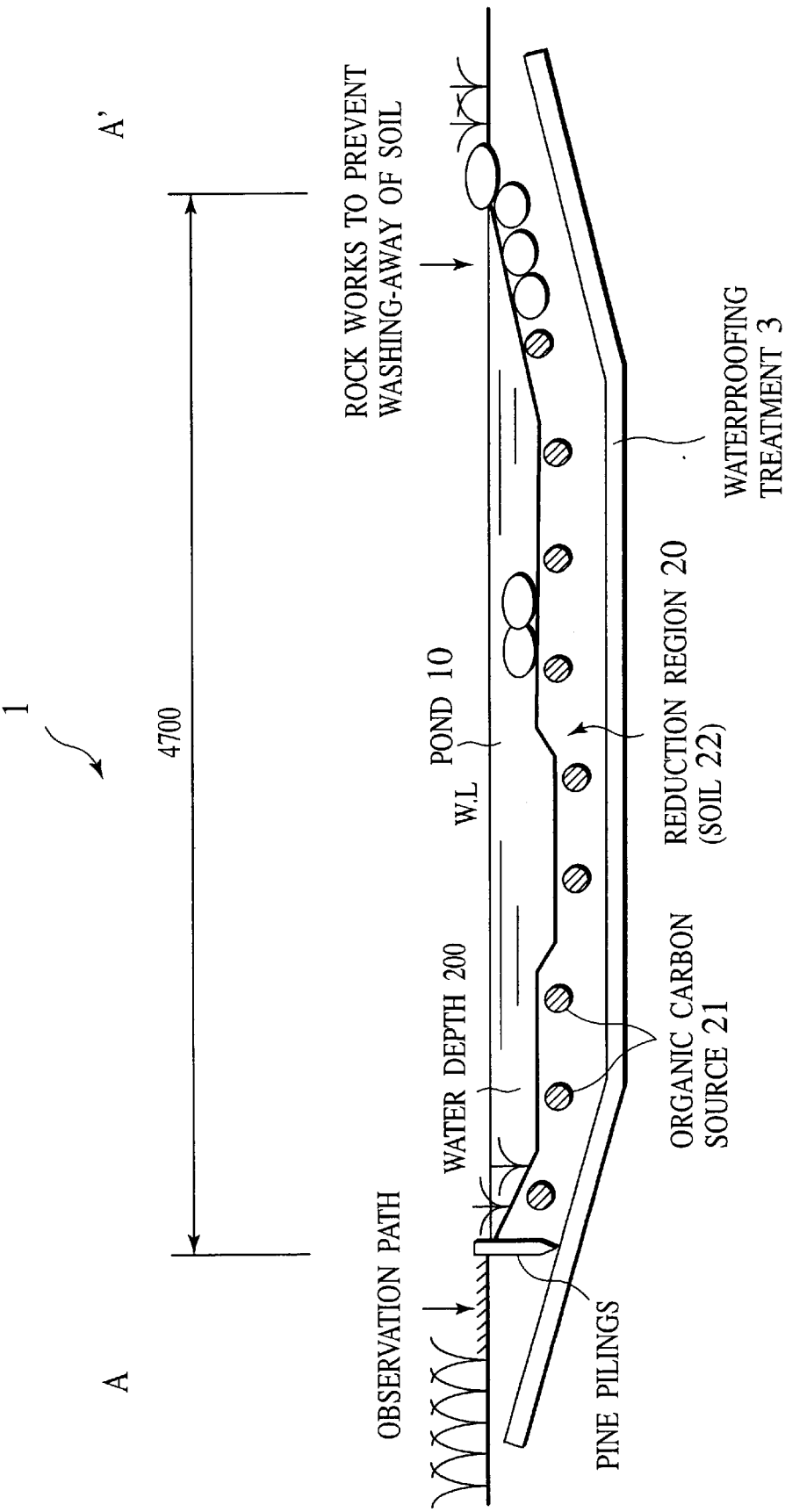
FIG. 4 is a schematic sectional view showing the cross section along line A—A' of FIG. 2.
Figure 5:
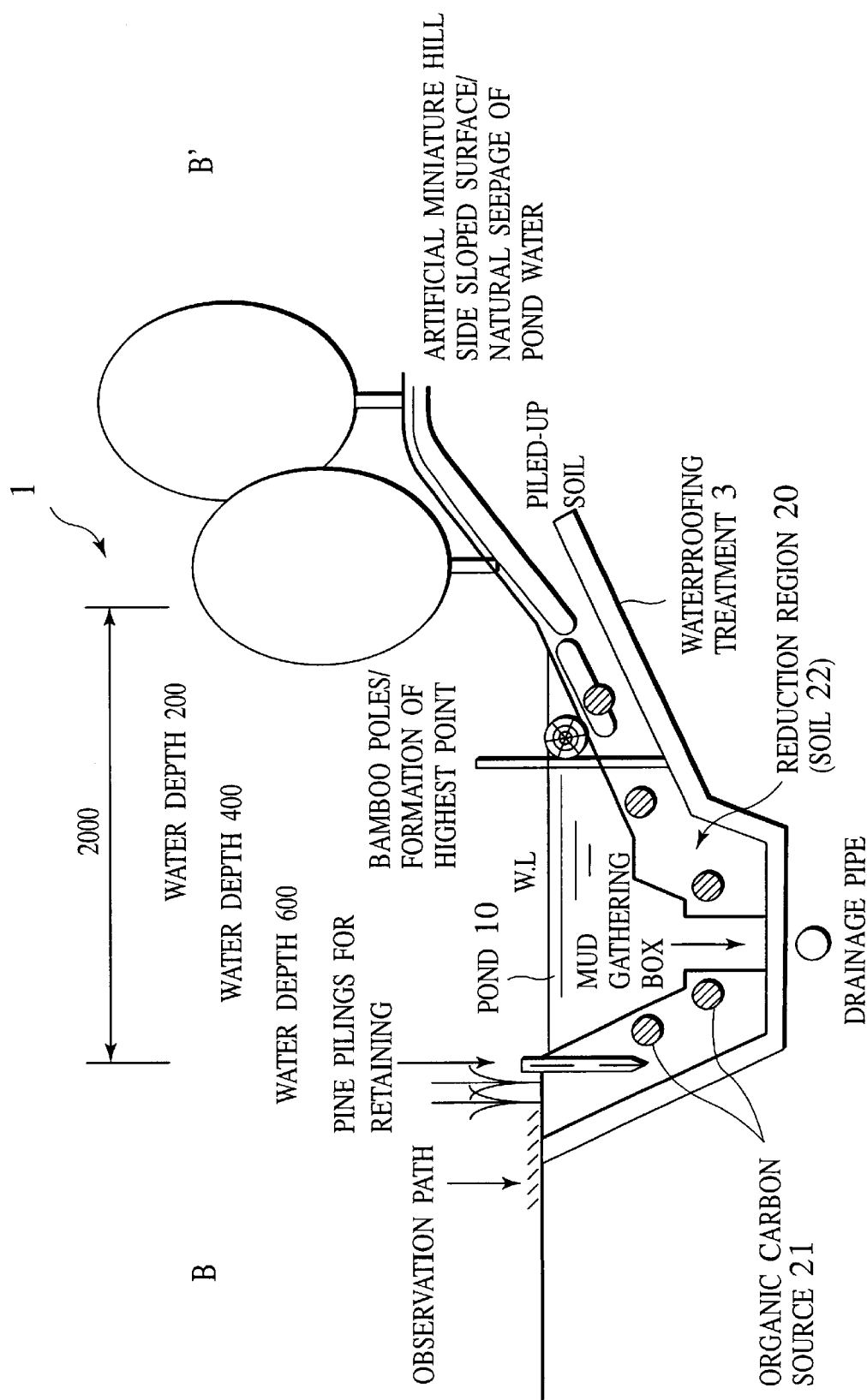
FIG. 5 is a schematic sectional view showing the cross section along line B—B' of FIG. 2.

There will be detailed below the preferred embodiments of the present invention with reference to the accompanying drawings. Like members are designated by like reference characters.

FIG. 1 is a schematic sectional view illustrating an embodiment in which a system for managing a water system habitat environment of the present invention is applied to, for example, a pond provided in the garden of a home of an individual. A system 1 for managing a water system habitat environment is a system which makes and maintains the quality of the water in the pond good by utilizing rain water.

To this end, in the system 1 for managing a water system habitat environment, a hole 2, which is of an appropriate size and depth, is dug in the place where a pond 10 is to be formed. The entire bottom portion of the hole 2 is subjected to a waterproofing treatment 3, and a depression 4 which is to become the pond 10 is formed. Substantially the entire bottom of the depression 4 is covered with soil 22, in which an organic carbon source 21, whose main component is aliphatic polyester, is mixed-in a target amount of 10 grams per 50 to 100 liters of water in the pond 10, so as to form a reduction region 20 of a necessary thickness. The system 1 for managing a water system habitat environment is thus structured to aim for a balance between the reduction changing due to the reduction region 20 and the oxidation changing due to an oxidation region 30 formed in the water of the pond 10.

For the soil 22, in which the organic carbon source 21 is mixed-in and which covers the bottom of the depression 4 and which forms the reduction region 20, the soil which is dug out to form the pond 10 can only be used therefore if this soil is soft and is good for retaining and draining water. If the soil which is dug out to form the pond 10 does not have such qualities, then among artificial soils, a soil which has properties which are optimal for forming the reduction region, e.g., a transported-in soil which is soft and is good for retaining and draining water such as an aggregate-type tuff loam or the like, can be used.

Further, the system 1 for managing a water system habitat environment is structured such that rain water flows from an eaves trough 41 adjacent to a house 40, through a water purification device 50 disposed so as to be able to intake rain water, and into the pond 10 from a water filling opening 11. Return water from the pond 10 is also introduced into the water purification device 50 due to operation of a circulation pump 60. A pipe 12 for water intake, which is connected to the circulation pump 60, opens at an appropriate position in the water in the pond 10, and a strainer 13 is removably mounted to this open end of the pipe 12. Further, not only are rain water and return water from the pond 10 filled in through the water purification device 50, but also, water is filled in through the water filling opening 11 of the pond 10 from a tap water pipe 14 for replenishing water.

The bottom portion of a mud gathering box 15, which is embedded in the lowermost portion of the pond 10, and a drainage box 16 are connected by a pipe 17. The drainage box 16 is disposed such that, when the pipe 17 is clogged, the water overflowing from the pond 10 flows into the drainage box 16 via an appropriate bypass groove. When the water level within the drainage box 16 exceeds a predetermined height, the water within the drainage box 16 is drained to the outside from an appropriate drainage groove.

Figure 12:
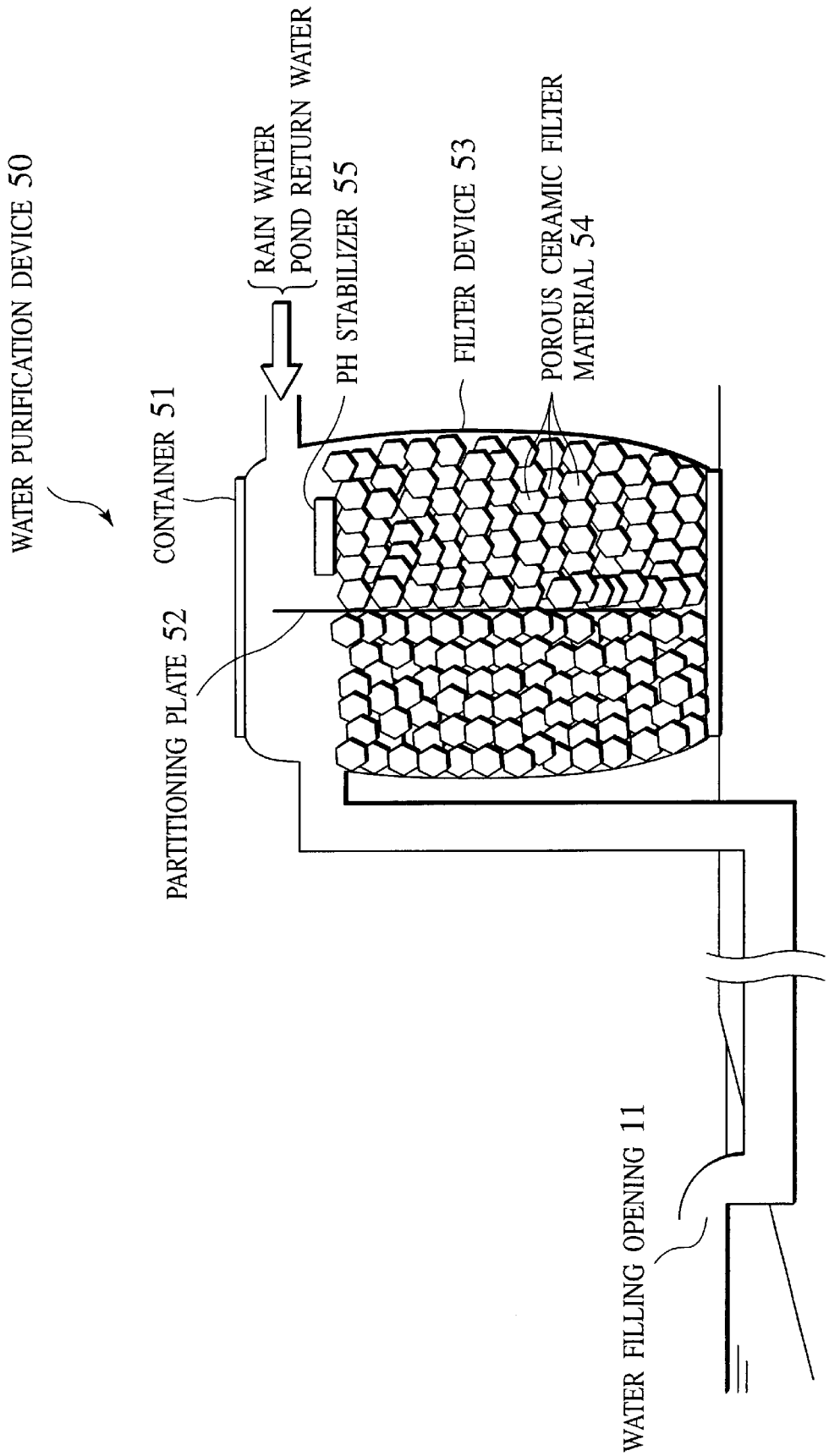
FIG. 12 is a schematic sectional view showing, in an enlarged manner, a water purification device in the system for managing a water system habitat environment of FIG. 1.

As shown in FIG. 12, at the water purification device 50, a partitioning plate 52 is provided at the central portion of a barrel-shaped container 51 of an appropriate size, such that the interior of the water purification device 50 is divided into two chambers which are an input side and an output side. A large number of porous ceramic filter materials 54 forming a filter device 53, and a pH stabilizer 50, are accommodated within the container 51. The porous ceramic filter materials 54 for the filter device 53 must have holes (pores) of a size such that aerobic bacteria are implanted at the surface layer portion and anaerobic bacteria are implanted at the central portion. Artificial sand whose components do not elute in water, e.g., ACIDUR block, can be used as the porous ceramic filter materials 54. An appropriate crystal which contains minerals can be used as the pH adjusting device 55.

The system 1 for managing a water system habitat environment is provided with an appropriate air pump for aeration (not shown) for aerating the water in the pond 10 so as to build up the oxidation region 30.

Next, an execution example of actually designing and executing the system 1 for managing a water system habitat environment showing the above-described embodiment will be described.

First, the dimensions of the pond 10 were a width of 4700 mm, a length of 2000 mm, an average depth of 300 mm, and a total water amount of about 2000 liters. The hole 2 of the necessary size was dug, piping work and pine piling/construction work were carried out, and the waterproofing treatment 3 was carried out to form the depression 4.

Next, a granulated organic carbon source 21a, whose main component was aliphatic polyester, was mixed-in into a transported-in soil which was soft and was good for retaining and draining water, such as an aggregate-type tuff loam or the like, with the target ratio being 1 gram of the organic carbon source 21a per 10 liters of water in the pond 10, which may well be within a range of 5 to 10 liters. A soil 22, into which the granulated organic carbon source had been mixed-in, was first made to cover, to a thickness of about 300 mm, substantially the entire bottom of the depression 4 (on top of the waterproofing treatment 3).

Next, on this covering soil, mold-shaped organic carbon sources 21b, whose main component was aliphatic polyester and which had been subjected to molding processing and one of which weighed approximately 10 grams, were placed at points which were disposed substantially uniformly from the center of the pond 10, with a target ratio being one mold-shaped organic carbon source 21b per 50 to 100 liters of water of the pond 10. Then, the soil 22, into which the granulated organic carbon source had been mixed-in, was placed on the mold-shaped organic carbon sources 21b to the extent (about 15 to 20 mm) that the mold-shaped organic carbon sources 21b were slightly hidden thereby. Thus, the covering soil, from the bottom of the pond 10, was about 320 mm.

The reason why both the granulated organic carbon source 21a and the larger mold-shaped organic carbon sources 21b were used as the organic carbon source 21 mixed into the covering soil is that, at the time of building-up of the environment, the effects of the organic carbon source 21 are brought out rapidly by the granulated organic carbon source 21a, and thereafter, the effects of the organic carbon source 21 can be maintained over a long period of time due to the mold-shaped organic carbon sources 21b.

Further, after the water was filled-in, in order to prevent collapse of the sloped portions and of the steeply sloped portions in particular, a mat, into which a natural material such as palm fibers or the like was woven, was placed at the sloped portions from the edge of the pond 10 for retaining. Moreover, in order to prevent the covering soil from being washed away, rock works were placed in a vicinity of the water filing opening 11. Ends of the waterproofing sheet for the waterproofing treatment 3 were cut to a uniform length, and soil was piled at the border portions of the waterproofing sheet. In addition, stones were also placed at the edge portion of the pond.

Next, emergent plants, floating-leafed plants and the like were planted in the pond 10, and after planting was completed, filling of water into the pond 10 was started.

After water filling, first, the reduction (anaerobic) region 20 was built up. Namely, a dead water state was maintained in order to promote the settling of minute suspended matter and to preserve the oligoaerobic state of the water in the pond 10. This period of the building up of the reduction region 20 required about three days during the summer with a maximum temperature of around 30° C. or more, required about 5 days in the spring and fall with a maximum temperature of around 20° C., and required from 7 to 10 days in the winter with a maximum temperature of 10° C. or less. During this time, auxiliary equipment such as the air pump for aeration (not shown), the water purification device 50 and the circulation pump 60 were not operated at all.

After building up of the reduction (anaerobic) region 20 was completed, building up of the oxidation (aerobic) region 30 was carried out. Namely, when a predetermined number of days had elapsed from the start of maintenance of the dead water state, operation of the air pump for aeration was started. Due to the aeration, the amount of dissolved oxygen in the water increased, and an aerobic environment rich in oxygen was formed at the surface layer portion of the soil 22 of the pond 10.

After two or three days elapsed from start of operation of the air pump for aeration, organisms were introduced, and operation of the water purification device 50 and the circulation pump 60 was started.

In a water environment which is at an appropriate water temperature and which is abundant with dissolved oxygen, the target completion for cycling is, from the start of operation of the water purification device 50 and the circulation pump 60, about 21 days in summer, about 28 days in spring and fall, and about 35 days in winter. After the predetermined number of days had passed, the state of the water was confirmed, and then operation of the air pump for aeration, the water purification device 50, and the circulation pump 60 was stopped.

At the time cycling was completed, the dead water system water system habitat environment, i.e., the dead water system biotope water environment, was stabilized. If this stable state continues, nothing else need be done. However, because the water environment may change due to the effects of various factors, after cycling was completed, when turbidity or whitish muddying was noted during close observation of the water quality, the air pump for aeration, the water purification device 50 and the circulation pump 60 were operated again, and the dead water state was resumed when the turbidity had been eliminated. By repeating such processes several times, the period of time in which the water environment was stable was lengthened, and thereafter, a water environment was prepared in which the degree of clearness of the water could be maintained over a long period of time even without aeration or circulation and filtering.

Next, on the basis of the above-described design/execution example, the system 1 for managing a water system habitat environment will be described in further detail with reference to the drawings.

<Water Environment>

The water environment is basically a dead water system. In cases in which an abundant water supply can be ensured, the water environment is a running water system. When a running water system is formed by using the circulation pump 60, the rate of flow of the circulation pump 60 is set appropriately.

<Water Source>

The water source is mainly rain water. At times when the amount of water is low, tap water can be used as replenishing water. Because rain water is used, an acidic rain is contemplated. The water purification device 50 is provided as an exclusive-use filter tank for use for the water of the pond 10 after the pH has been adjusted. The water purification device 50 neutralizes the water quality by using the organism filtering function thereof to remove oxides due to consumption of carbon by aerobic microorganisms and reduction filtering. Further, an increase in the pH is also promoted by the pH adjusting device 55.

<Maintenance of Water Quality>

In the case of a dead water system, the water quality is maintained by carrying out physical filtering as little as possible, and removal of substances leading to pollution of the water is mainly carried out by substance changing reactions occurring due to biochemical methods. Further, in the case of a running water system, the return water is returned to the water purification device 50 and circulated, such that water management is carried out in conjunction with the substance changing reactions occurring due to biochemical methods within the pond 10. Nonconservative substances which impede maintenance of a pure water quality are divided into nitrogen based, sulfur based, carbon based, and phosphor based substances. Biochemical methods promote changing reactions of the respective chemical species by oxidation and reduction methods, and ultimately prevent water system eutrophication due to the gasification of chemical species and the release of the gasses into the atmosphere. Moreover, phosphor based organic wastes, which do not change form to a gaseous state, undergo a specific adsorption settling reaction with metal ions dissolved in the water, and undergo an elution reaction which accompanies the reduction change of the metal ions in the reduction region which has been artificially built up, and are then released by alimentation by grasses such as makomo or the like.

Figure 8:
FIG. 8 is a diagram for explaining a process of oxidation change reaction/reduction change reaction/release into the atmosphere of nitrogen based organic wastes in the system for managing a water system habitat environment of FIG. 1.
Figure 9:
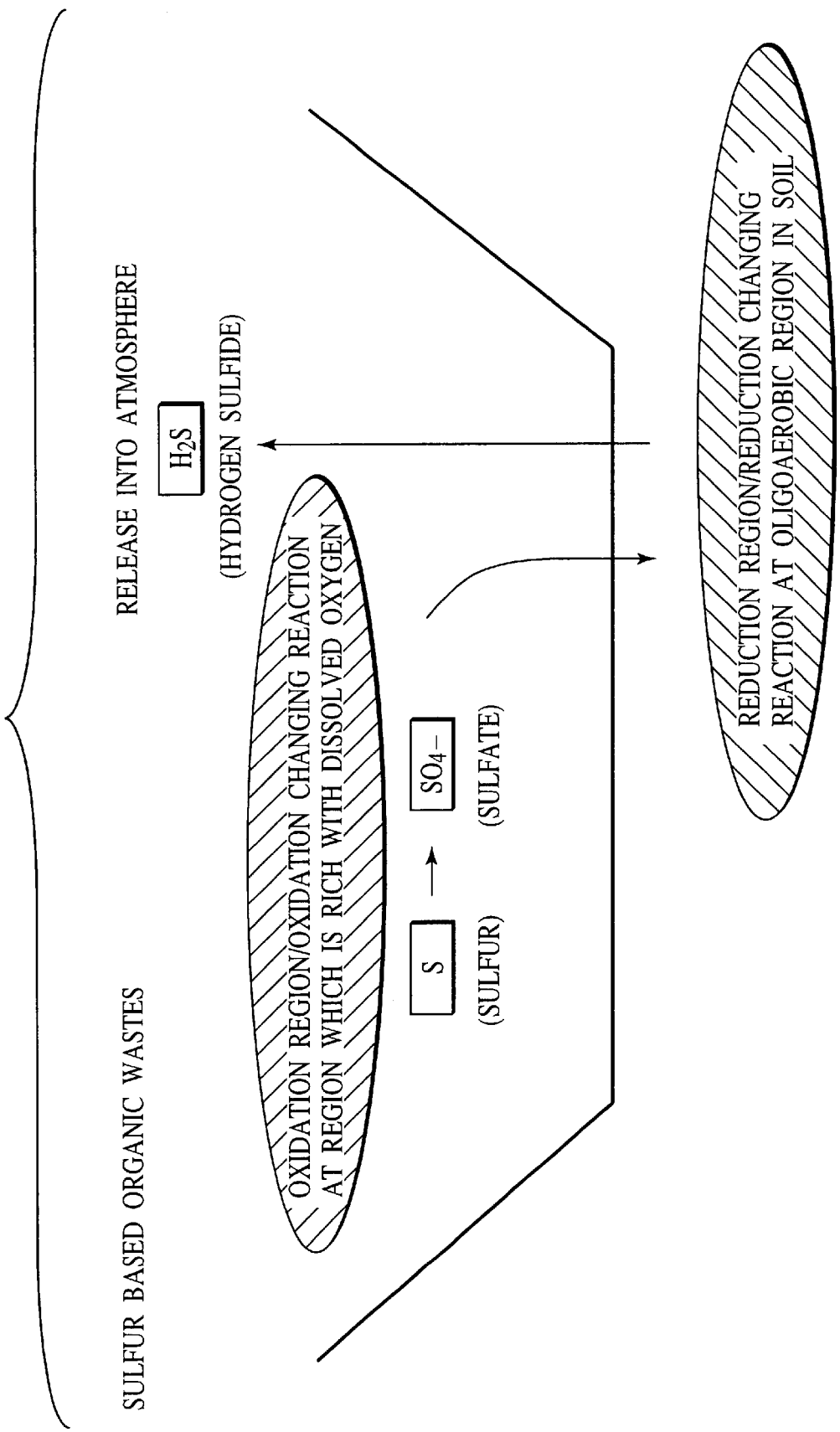
FIG. 9 is a diagram for explaining a process of oxidation change reaction/reduction change reaction/release into the atmosphere of sulfur based organic wastes in the system for managing a water system habitat environment of FIG. 1.

For nitrogen based organic wastes, the main chemical species changing process is, as shown in FIG. 8, a process of oxidation changing (ammonia→nitrite nitrogen→nitrate nitrogen)→reduction changing (nitrogen gas)→release into the atmosphere. Further, as shown in FIG. 9, for sulfur based organic wastes, the process is oxidation changing (sulfur→sulfite→sulfate)→reduction changing (hydrogen sulfide)→release into the atmosphere. For carbon based organic wastes, as shown in FIG. 10, the process is oxidation changing (carbon→carbon dioxide)→reduction changing (carbon→methane gas)→release into the atmosphere. Moreover, for phosphor based organic wastes, as shown in FIG. 11, the process is oxidation elution (phosphor→phosphate→strong affinity adsorption settling with metal ions (Al, F, Ca) in the solute)→reduction elution (elution reaction accompanying the reduction change of the metal ions)→alimentation by True Grasses such as marsh reeds, and the like.

In a biotope environment which unlimitedly imitates a natural system, it is essential that the above-described changing reactions are carried out unfalteringly, and that the water always be maintained in an oligotrophic state. To this end, it is necessary to maintain a balance between the reduction changing and the oxidation changing of the solute. For this reason, the reduction region 20 and the oxidation region 30 are formed, as shown in FIG. 1.

<Structures>

As shown in FIGS. 2 through 5, a wood deck is provided at the northeast side to form a region which can be used by people. In the shaded portion under the deck, a habitat for river shrimp such as sujiebi is formed. Moreover, a path which leads to the wood deck from the observation path, and a path for maintenance which is connected to the water drainage opening, are provided, and the surfaces of the paths are strewn with wood chips.

At the southwest side, an artificial miniature hill is formed by using the soil which was dug up. Water of the pond 10 naturally seeps into the soil of the artificial miniature hill. At the north side of this hill, a retaining work is provided by disposing driftwood or planting emergent plants in towards the pond 10, so as to form a marshy environment and provide a place for fireflies to pupate. Further, a bird table or the like is disposed at the south side of the artificial miniature hill, and mainly actual trees are planted such that the entire hill becomes a bird path.

Posts (of a diameter of 100 mm) are driven in continuously at the north edge side, for retaining. In order to prevent corrosion over a long period of time, pine pilings are used for the posts. Bamboo poles are erected in front of the artificial miniature hill, so as to form the highest point in the habitat structure for dragonflies.

There is the possibility that the soil in the vicinity of the water filling opening 11 for rain water and circulated water will be washed away. Thus, stones of about 30 cm are placed at the bottom portion thereof to prevent outflow of soil. Further, the stones which are about 30 cm can be arranged so as to guide the flow of water. In order to promote the implantation of seaweeds and mosses, which serve as food for snails and fishes, mainly granite is used.

<Arrangement of Plants>

Figure 6:
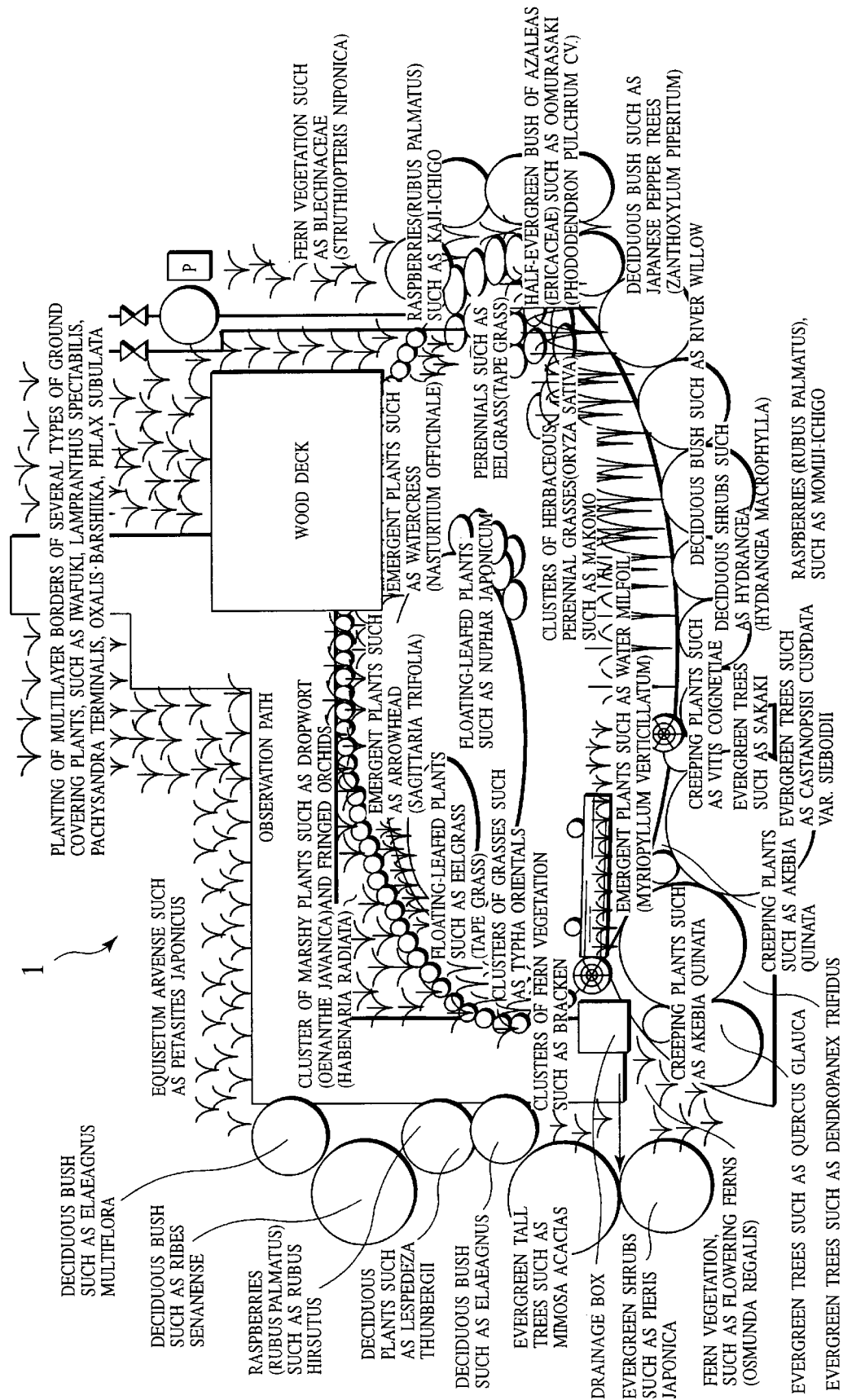
FIG. 6 is a schematic plan view showing an arrangement of main flora in the system for managing a water system habitat environment of FIG. 1.

As shown in FIG. 6, at the south side artificial miniature hill portion, in order to form an arboreal environment into which insects such as beetles (coleoptera) and stag beetles can be easily introduced naturally, fagaceous evergreen trees such as *Quercus glauca* and *shirakashi* are planted. Evergreen trees such as *sakaki* and *Dendropanex trifidus* and deciduous creeping plants such as *Akebia quinata, Stauntonia hexaphylla*, and *Vitis coignetiae* are provided in order for wild birds such as mejiro to gather. Further, at the drainage water box side, evergreen tall trees such as *Mimosa acacias* and evergreen shrubs such as *Pieris japonica* are placed. Fern vegetation, such as bracken and flowering ferns (*Osmunda regalis*) is planted on the ground surface. By placing deciduous shrubs such as raspberries (*Rubus palmatus*) and hydrangea (*Hydrangea macrophylla*) at the south surface, a region which is dense, even if small-sized, is formed. Shrubs such as willows and Japanese pepper trees (*Zanthoxylum piperitum*) are placed at the southeast side, and raspberries and azaleas are disposed at the east side so as to prevent direct sunlight at the water's edge in a vicinity of the water filling opening 11. Multilayer borders of several types of ground covering plants are disposed at the periphery of the wood deck and the observation path so that flowering plants grow luxuriously throughout the four seasons. At the north side, a cluster of Equisetum arvense and *Petasites japonicus* are provided. A cluster of marshy plants such as dropwort (*Oenanthe javanica*) are made to grow at the north side water's edge, so as to cultivate an environment which is easy to live in and which is safe for the organisms of the habitat. At the west side, plural types of actual deciduous shrubs are provided so as to block direct sunlight in the summer. Moreover, in the water at the west side, clusters of emergent plants such as *Typha orientalis* and water milfoil (*Myriopyllum verticillatum*) are formed. At the south side shallows, clusters of grasses are formed. In the water at the north side are provided emergent plants such as watercress (*Nasturtium officinale*) and arrowhead (*Sagittaria trifolia*). Floating-leafed plants such as eelgrass are provided in the deep portions. In a vicinity of the center of the pond, floating-leafed plants such as *Nuphar japonicum* are placed so as to form a breeding place for fireflies and a protective region for transplanted organisms.

<Structure of Habitat>

Figure 7:
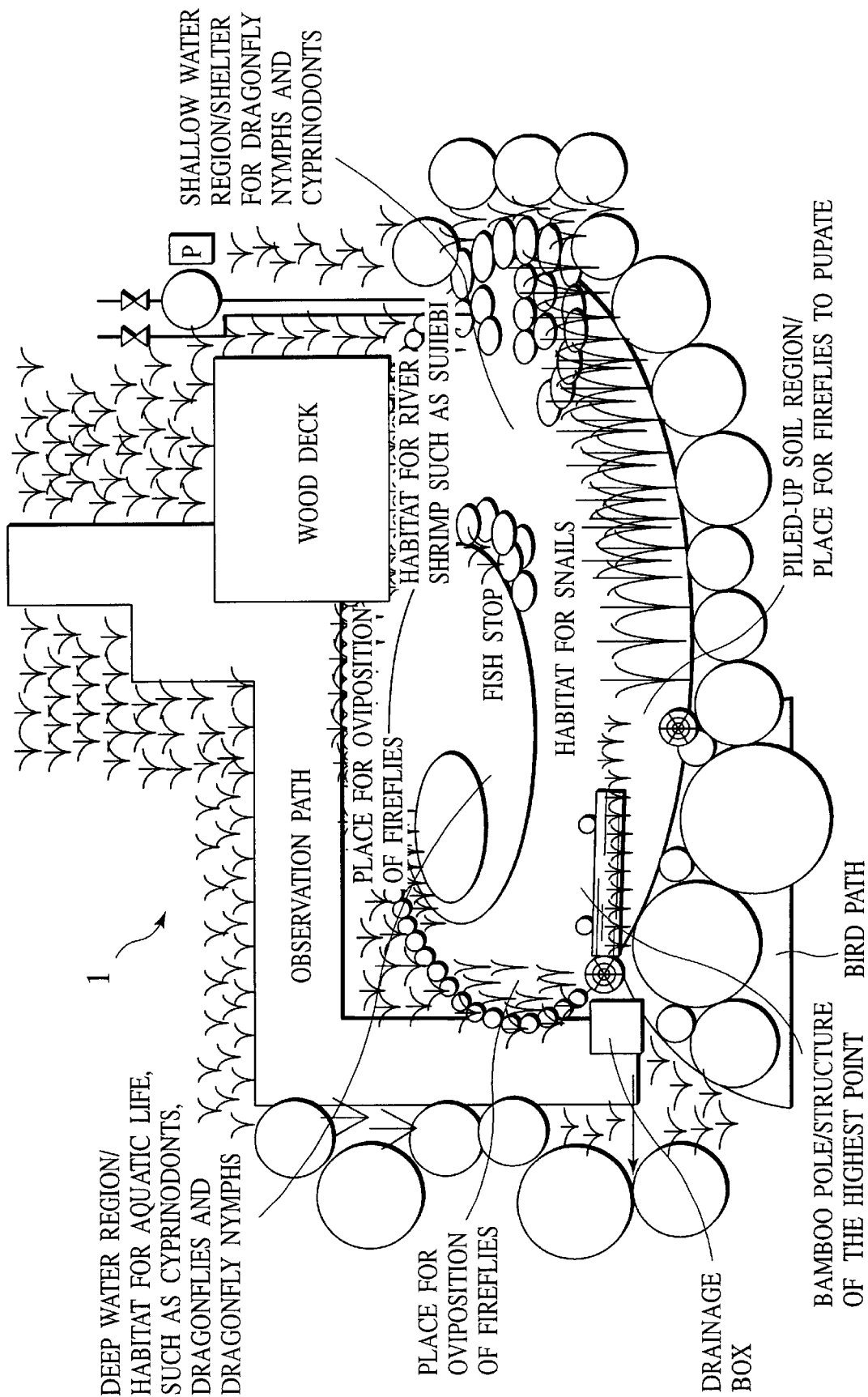
FIG. 7 is a schematic plan view showing main introduced species and the biocycle of the system for managing a water system habitat environment of FIG. 1.

As shown in FIG. 7, in the case of a dead water system, Heike fireflies are artificially introduced, and in the case of a running water system, Genji fireflies are introduced. At the same time, freshwater snails such as mud snails and marsh snails (*Semisulcospira bensoni*) which serve as food are introduced. Moreover, dragonflies, cyprinodont, freshwater shrimp such as sujiebi, and frogs, which are organisms which are symbiotic with fireflies but would not naturally migrate in, are also introduced. At this time, introduction of organisms which would disturb the ecosystem, such as carp, black bass, blue gills, and American crawfish is prevented.

<Fireflies>

Soil is piled up at the side surface of the artificial miniature hill so as to form a gently sloped surface, and restraining work for structures into which the pond water seeps, such as the arranging of driftwood or the planting of emergent plants, is carried out so as to form a place where fireflies pupate. The soil at the place for pupation is soft and is good for retaining and draining water Soil which clumps and becomes hard when dry is not appropriate.

The breeding area or habitat region is basically shaded, and an environment in which the water temperature is cool is preferable. Thus, miscellaneous trees are densely planted at the artificial miniature hill, and to the left and right of the artificial miniature hill, short miscellaneous trees are planted and tall emergent plants are provided. In this way, a dense, small forest is formed so as to prevent the pond from being illuminated by direct sunlight.

By providing various types of emergent plants and floating-leafed plants at the water's edge, a habitat region for larva is formed. Further, because the food for freshwater snails, which themselves serve as food, is mainly Diatomacae, driftwood and rocks are placed at the west side and east side of the pond so as to form regions for the growth of seaweeds.

In the case of a dead water system, Heike fireflies are introduced. However, in a case in which Genji fireflies are introduced, the structures of the pond must be changed into running water structures such as circulating type structures and the like. Further, in order to maintain a water environment which is suitable for the larva of fireflies, a large amount of dissolved oxygen is always required. Thus, an appropriate oxygen generating device is set in the pond for artificially supplying oxygen.

<Dragonflies>

The species which are introduced are dragonfly nymphs such as aquatic plant type ginnyannma or oniyannma. The structure of the habitat is such that a water depth change is provided by a gentle slope in the pond at a water depth of around 50 cm or less which becomes a habitat environment for large dragonfly nymphs, and at the bottom of the pond, various types of emergent plants are planted so as to prepare the habitat environment for the dragonfly nymphs.

<Cyprinodonts>

Kawamedaka (kuromedaka) are introduced. In a pure water environment, the breeding thereof is relatively easy. Thus, at the time of artificial introduction, a diverse habitat environment is prepared. Moreover, consideration is given to management for maintaining the pure water quality.

<River Shrimp>

The types which are introduced are tenagaebika sujiebizoku sujiebi, tenagaebizoku tenagaebi, as well as land-locked type river shrimp such as large egg type numaebi, minaminumaebi, nukaebi, and the like. Because migrating type river shrimp such as yamatonumaebi and small egg type numaebi and the like grow and develop in seawater, introduction thereof is not appropriate, and even if such river shrimp are introduced, they will not proliferate naturally.

<Frogs>

The types which are introduced are moriaogaeru, shuregeruaogaeru, kajikagaeru, nihonnamagaeru, azumahikigaeru and the like. At the time of artificial introduction, a diverse habitat environment is prepared. Moreover, consideration is given to maintaining the pure water quality.

Note that in the above-described embodiment, the large number of porous ceramic filter materials 54 forming the filter device 53 and the pH adjuster 55 are accommodated within the container 51 of the water purification device 50, such that both are formed integrally. However, the present invention is not limited to the same, and the filter device 53 and the pH adjuster 55 may be provided separately.

For example, the filter device 53 is effective at the time of building up of the biotope. Thus, after cycling has been completed, or in accordance with the generation of whitish muddying or turbidity which occurs thereafter, the process of again operating the air pump for aeration, the water purification device 50 and the circulation pump 60 is repeated any number of times. In this way, a water environment is prepared in which, even without aeration or circulation filtering, the degree of clearness of the water can be maintained over a long period of time, and after preparation of this water environment, the filter device 53 can be removed from the place if needed.

Further, when the building up of the biotope can be carried out over a relatively long period of time at a low cost, a balance between the reduction region 20 and the oxidation region 30 within the pond 10 can be achieved by taking a long time. Thus, if needed, the filter device 53 can be omitted from the start.

In the case of forming a running water system by using the circulation pump 60, the circulation pump 60 can be set and used in a case in which the filter device 53 is removed from the place after cycling has been completed or after the water environment has been prepared, or in a case in which the filter device 53 is omitted from the start. In this way, it is possible to form a running water system.

It is preferable to keep the pH adjuster 55 at all times in order to continually adjust the pH of the rain water even after the water environment has been prepared in a case in which biotope is carried out by using rain water. However, for example, in a case in which biotope is carried out by using well water, spring water, tap water, or the like, the pH adjuster 55 may be omitted from the start.

Moreover, in the above-described embodiment, the system 1 for managing a water system habitat environment is applied to a pond provided in the garden at the home of an individual. However, the present invention is not limited to the same. For example, the present invention may be applied to a relatively large pond provided in a park or garden of any of various types of public facilities.

As described above, the present invention is structured to create and maintain a good quality of water in a pond by placing, to a needed thickness, soil, in which an organic carbon source is mixed-in a needed amount with respect to the amount of water in the pond, on substantially the entire bottom of a depression which is to become the pond and whose bottom portion has been subjected to a waterproofing treatment, and by filling-in water and maintaining a dead water state over a predetermined number of days so as to build up a reduction region, and thereafter, building up an oxidation region by carrying out aeration over a predetermined number of days. Thus, due to oxides which accumulate in a relatively small-scale water environment being continuously and effectively reduction changed and released into the atmosphere, a balance between the oxidation changing and reduction changing of solute can be achieved. Furthermore, the building up to the balanced state can be carried out in a short period of time from the creation of the water environment, and the balanced state can be maintained over a long period of time.

While preferred embodiments of the present invention have been described using specific terms, such description is for illustrative purposes, and it is to be understood that changes and variations may be made without departing from the spirit or scope of the following claims.

What is claimed is:

1. A method for managing a water system habitat environment which creates and maintains a clear state of water quality of a pond, the method comprising the steps of:

placing, to a necessary thickness and on substantially an entire bottom of a depression whose bottom portion has been subjected to a waterproofing treatment and which is to become the pond, soil in which is mixed-in an organic carbon source in a necessary amount with respect to an amount of water in the pond;

building up a reduction region by filling in water and maintaining a dead water state for a predetermined number of days; and thereafter, building up an oxidation region by effecting aeration for a predetermined number of days.

2. A method for managing a water system habitat environment which creates and maintains a clear state of water quality of a pond according to claim 1, further comprising filling rain water in through a pH adjusting portion which has a pH adjusting function.

3. A method for managing a water system habitat environment according to claim 1, wherein following the building up of the oxidation region, a filter device which has an organism filtering function is operated for a predetermined number of days, and due to the water of the pond passing through the filter device, a water environment is stabilized.

4. A method for managing a water system habitat environment according to claim 3, wherein the organism filtering function of the filter device is an organism filtering function due to aerobic bacteria implanted at a surface layer portion of a porous ceramic filter material and anaerobic bacteria implanted at a central portion.

5. A method for managing a water system habitat environment according to claim 3, wherein a target number of days of operation of the filter device is about two to four weeks in the summer, is about four to six weeks in the winter, and is a period of time therebetween in spring and fall.

6. A method for managing a water system habitat environment according to claim 3, wherein in a case in which there is turbidity in the water of the pond after a water environment has been stabilized by operation of the filter device, the filter device is again operated until the turbidity is eliminated, and this process is repeated until a degree of clearness of water in a dead water state can be maintained.

7. A method for managing a water system habitat environment according to claim 3, wherein after a water environment has been stabilized by operation of the filter device, or after operation of the filter device has been repeated until a degree of clearness of the water in a dead water state can be maintained, the filter device is removed.

8. A method for managing a water system habitat environment according to claim 3, wherein after a water environment has been stabilized by operation of the filter device, or after operation of the filter device has been repeated until a degree of clearness of the water in a dead water state can be maintained, the water of the pond is maintained in a running water state in which the water is substantially circulated.

9. A method for managing a water system habitat environment according to claim 1, wherein after the soil is placed in, planting of plants at appropriate places is carried out, and after building up of the oxidation region, organisms are introduced.

10. A method for managing a water system habitat environment according to claim 1, wherein a main component of the organic carbon source is aliphatic polyester, and a target ratio of the organic carbon source mixed in the soil is 10 grams of the organic carbon source 50 to 100 liters of the water of the pond.

11. A method for managing a water system habitat environment according to claim 1, wherein a target period of time for the building up of the reduction region is several days in summer, is one to two weeks in winter, and is a period of time therebetween in spring and fall.

12. A method for managing a water system habitat environment according to claim 1, wherein a target period of time for the building up of the oxidation region is several days.

13. A system for managing a water system habitat environment which creates and maintains a clear state of water quality of a pond, the system comprising:

a reduction region of a necessary thickness which is formed by placing, on substantially an entire bottom of a depression whose bottom portion has been subjected to a waterproofing treatment and which is to become the pond, soil in which is mixed-in an organic carbon source in a necessary amount with respect to an amount of water in the pond; and an aerating device for building up an oxidation region.

14. A system for managing a water system habitat environment which creates and maintains a clear state of water quality of a pond according to claim 13, further comprising a pH adjusting portion disposed at a place at which rain water is taken in.

15. A system for managing a water system habitat environment according to claim 14, further comprising:

a filter means having an organism filtering function; and a circulation pump which circulates the water of the pond through the filter.

16. A system for managing a water system habitat environment according to claim 15, wherein the filter is formed from a large number of porous ceramic filter materials having holes (pores) of a size such that aerobic bacteria are implanted at a surface layer portion and anaerobic bacteria are implanted at a central portion.

17. A system for managing a water system habitat environment according to claim 15, wherein the filter is provided at a place at which rain water is taken in, and the filter filters circulated water of the pond and rain water.

18. A system for managing a water system habitat environment according to claim 17, wherein both the filter and the pH adjusting portion are accommodated in a common container, and due to both rain water and the circulated pond water passing through the container, both the rain water and the circulated pond water are filtered and the pH thereof adjusted.

19. A system for managing a water system habitat environment according to claim 13, wherein plants are planted within the pond and at a periphery of the pond, and organisms are introduced within the pond and at a periphery of the pond.

\* \* \* \* \*

UNITED STATES PATENT AND TRADEMARK OFFICE
CERTIFICATE OF CORRECTION

PATENT NO. : 6,387,265 B1
DATED : May 14, 2002
INVENTOR(S) : M. Hosoya

It is certified that error appears in the above-identified patent and that said Letters Patent is hereby corrected as shown below:

Column 14,
Line 11, delete "means"

Signed and Sealed this

Twenty-fifth Day of February, 2003

JAMES E. ROGAN
*Director of the United States Patent and Trademark Office*